United States Patent [19]

Go et al.

[11] 3,887,633

[45] June 3, 1975

[54] POLYMER OILS AND PROCESS FOR PREPARING SAME

[75] Inventors: Tadahiro Go; Motoyuki Yamato, both of Kawasaki, Japan

[73] Assignee: Nippon Zeon Co., Ltd., Tokyo, Japan

[22] Filed: Aug. 6, 1973

[21] Appl. No.: 385,897

[30] Foreign Application Priority Data

Aug. 16, 1972 Japan.................................. 47-81952

[52] U.S. Cl............. 260/683.9; 252/59; 260/676 R; 260/683.15 B
[51] Int. Cl.²......................................... C07C 5/02
[58] Field of Search ............... 260/683.9, 683.15 B; 252/59, 63

[56] References Cited
UNITED STATES PATENTS

| | | | |
|---|---|---|---|
| 2,753,382 | 7/1956 | Hamner........................... | 260/680 B |
| 3,312,621 | 4/1967 | Brownawell et al. .................. | 252/59 |
| 3,446,785 | 5/1969 | Stafford............................... | 260/93.1 |
| 3,752,767 | 8/1973 | Eckert et al. .......................... | 252/59 |

*Primary Examiner*—Herbert Levine
*Attorney, Agent, or Firm*—Bucknam and Archer

[57] ABSTRACT

A process for preparing polymer oils comprising polymerizing 1,3-pentadiene together with or without at least one other olefin copolymerizable therewith in a homogenizable Friedel Crafts type catalyst to produce a liquid polymer having a number average molecular weight of 300 – 1,000 wherein at least 70 percent of the pentadiene units is of trans structure and then hydrogenating said liquid polymer to the extent that its iodine number is decreased to not more than 60; the polymer oils; and compositions containing the polymer oil as the base material.

10 Claims, No Drawings

POLYMER OILS AND PROCESS FOR PREPARING SAME

This invention relates to a process for preparing novel polymer oils and to the novel polymer oils and their compositions. More particularly, it relates to a process for preparing novel polymer oils which comprises subjecting to hydrogenation a liquid homopolymer of 1,3-pentadiene or a liquid copolymer of 1,3-pentadiene and small amounts of at least one other olefin, the homopolymer or copolymer having a number average molecular weight of from 300 to 1,000 wherein at least 70 percent of the pentadiene units is of trans structure, to the extent that the unsaturation of the original polymer is reduced to that equivalent to an iodine number of 60 or less.

Many studies have long been made on processes for the cationic polymerization of unsaturated hydrocarbons in the presence of a Friedel-Crafts type catalyst, and it has been known that any of rubbery, resinous, liquid and gel-like polymers can be obtained by the selective use of catalyst and polymerizing conditions such as a combination of monomers used. Typical of these polymers are polyisobutylene and petroleum resins. With the development of ethylene plants to a large scale, the fractions produced thereby as the by-products are gradually increased. In one of attempts to make effective use of such fractions, studies of cationic polymerization have been resumed. There have heretofore been made various studies of 1,3-pentadiene contained in a $C_5$ fraction in large proportions to enhance the commercial value, and make effective use, of the pentadiene. It is known that the $C_5$ fraction containing large amounts of 1,3-pentadiene is polymerized in the presence of a homogenizable Friedel-Crafts type catalyst such as boron trifluoride to obtain a liquid polymer therefrom (U.S. Pat. No. 2,753,382), and that 1,3-pentadiene is polymerized in the presence of alkylaluminum dichloride to obtain a liquid polypentadiene therefrom (U.S. Pat. No. 3,446,785).

The liquid polymers obtained by these known processes have an iodine number of usually at least 250 as determined by Wijs method and are considered to be useful mainly for paints as a synthetic drying oil which may replace a natural drying oil such as linseed, safflower, soyabean or tung oil. However, a highly unsaturated liquid polypentadiene which is among the conventional liquid polymers, generally has a strong unpleasant odor without being subjected to a certain special treatment and is colored somewhat light-yellow, and it is thus not considered highly valuable from the commercial point of view.

In the course of their intense study made in an attempt to eliminate the aforesaid drawbacks of the conventional liquid polypentadienes, the present inventors found that as the hydrogenation of a liquid polypentadiene proceeds while decreasing its unsaturation, the polypentadiene becomes an unpleasant odor-free and more transparent liquid material which is very superior as a non-drying oil. This invention is based on this finding.

An object of this invention is to provide a novel polymer oil which is tasteless, odorless, transparent and superior in thermostability and electrical insulation with a low viscosity and high ignition point.

Another object of this invention is to provide a process for the preparation of such novel polymer oil.

Still another object of this invention is to provide polymer oil compositions such as an insulating oil and a lubricant each containing said polymer oil.

The process of this invention comprises the steps of polymerizing 1,3-pentadiene together with or without at least one other olefin copolymerizable therewith in amounts of not more than 20 percent by weight of the total monomers, at temperatures of from about −30° to about 100°C and at pressures of preferably less than 50 $Kg/cm^2$ in the presence of a "homogenizable" Friedel-Crafts type catalyst to produce a liquid polymer having a number average molecular weight of 300 – 1,000 and an iodine number of not less than 250 wherein at least 70 percent of the pentadiene units is of trans structure, and then hydrogenating the thus-produced liquid polymer to the extent that its iodine number is decreased to not more than 60 as determined by Wijs method, thereby obtaining the polymer oil.

The polymer oils of this invention are those which have a number average molecular weight of 300 – 1,000, preferably 300 – 800, an iodine number of not more than 60, preferably 30 and more preferably 10, an acid value of not more than 0.02 mg KOH/g, a saponification value of not more than 0.02 mg KOH/mg, a Hazen number of not more than 50 and a specific gravity of 0.92 – 0.94.

The specific liquid polymers which may be used in the hydrogenation are those wherein at least 70 percent of the pentadiene units are of trans structure, and they are produced by the known processes for polymerizing 1,3-pentadiene together with or without at least one other olefin copolymerizable therewith in the presence of a homogenizable Friedel-Crafts type catalyst.

The words "trans structure" used herein is intended to include trans-1,2 and trans-1,4 structures.

The term "homogenizable" used herein is intended to mean "gaseous," "liquid" or "solvent-soluble."

The other olefins copolymerizable with 1,3-pentadiene include those having 4-5 carbon atoms, such as butene-1, isobutene, 1,3-butadiene, isoprene, pentene-1,2-methylbutene-2, cyclopentene and the like. In the preparation of the polymer oils of this invention, at least one such olefin may be used in amounts of preferably 20 percent or less, more preferably 10 percent or less, based on the weight of the total monomers used; however, it is preferable to use 1,3-pentadiene singly.

The homogenizable Friedel-Crafts type catalysts which may be used in the practice of this invention, include boron trifluoride and its complexes, solubilized aluminum chloride, tin tetrachloride, ferric chloride, alkylaluminum dichloride, sulphuric acid and the like, with boron trifluoride and its complexes being preferred. The specific liquid polypentadiene thus obtained is a synthetic drying oil which has an iodine number of at least 250 as determined by Wijs method, evolves unpleasant odor and is colored somewhat light-yellow.

According to this invention, the specific liquid polymers including the specific liquid polypentadiene, having high unsaturation are hydrogenated by any known hydrogenating process to obtain a polymer oil wherein the unsaturation in the molecule is decreased to that equivalent to an iodine number of 60 or less. The hydrogenation is effected using a known catalyst in the presence or absence of a suitable solvent. Examples of hydrogenating catalysts which may be used include nickel, palladium, platinum, cobalt, osmium, rhenium, Raney nickel, nickel sulphide, nickel oxide, copper chromite, cobalt-molybdenum, chromium, molybdenum oxide, molybdenum sulphide, platinum oxide and cobalt oxide, as well as combinations of organometallic compounds and fatty acid salts of transition metals. Any known catalyst for hydrogenation may be used herein. In addition, alumina, silica gel, various kinds of clay, charcoal and the like may be used as the carrier. The solvents which may be used include aliphatic, alicyclic and aromatic solvents, such as pentane, hexane, heptane, octane, cyclohexane, decalin, tetralin, benzene, toluene, xylene and the like. The hydrogenation is continually or batchwise effected at temperatures of from room temperature to a temperature below the temperature at which the specific liquid polypentadiene or other specific liquid polymer used is degraded, preferably at 100° – 300°C. The pressure used in this hydrogenation is not especially limitative but in the range of from atmospheric pressure to 300 atm. The reaction time used ranges from about 10 minutes to about 20 hours, preferably from about 10 minutes to about 3 hours.

The thus-obtained polymer oil has many superior properties which are, for example, a number average molecular weight of approximately 300 – 1,000, an iodine number of not more than 60, an acid value of not more than 0.02 mg KOH/g, a saponification value of 0.02 mg KOH/g, a Hazen number of not more than 50 and a specific gravity of 0.92 – 0.94. The specific liquid polymer so hydrogenated or the polymer oil of this invention is tasteless, odorless, colorless, transparent and entirely free of unpleasant smell and coloration. In addition, it is quite innoxious since it is obtained not by separation from a petroleum fraction but by synthesis and it therefore contains no aromatic hydrocarbons. The polymer oil of this invention is further advantageous in that it has a pour point of as low as −30°C or lower and contrastively a boiling point of as high as 300°C or higher, a high ignition point and a flash point of 180°C or higher, superior thermostability, good electrical insulation and very satisfactory mutual solubility in animal, vegetable and mineral oils, such as liquid paraffin, olive oil, squalane, turtle oil, mink oil and camellia oil, and that it shows very low values when subjected to the oil swelling test for plastics such as polyethylene and polypropylene. The polymer oil is still further superior in affinity and ductility with respect to skin. The polymer oils of this invention having the aforesaid desirable properties can be produced only by providing the specific liquid polymer and hydrogenating this specific polymer to the aforesaid specific extent. A liquid polypentadiene the iodine number of which is more than 60, is somewhat smelly because of its insufficient deodorization, inferior in heat and oxidation stabilities and liable to be cured or hardened after allowed to stand for a long time, whereby it is rendered unsuitable as a non-drying oil. A liquid polypentadiene having a number average molecular weight of over 1,000, has a remarkably higher viscosity and a less low pour point thereby rendering it unsuitable for use as the polymer oil having substantially excellent low-temperature properties. When a liquid polypentadiene having a number average molecular weight of less than 300 is hydrogenated, there will be obtained a polymer oil having low ignition and flash points and inferior thermostability. If there is hydrogenated a liquid polypentadiene which was prepared from less than 80 percent by weight of 1,3-pentadiene and more than 20 percent by weight of at least one other olefin copolymerizable therewith and in which less than 70 percent of the pentadiene units is of trans structure, there will be obtained a polymer oil having a higher viscosity and less low pour point. The use of a liquid cis-polybutadiene in substitution for the specific liquid polypentadiene in the hydrogenation process will give a wax-like product, and the use of polybutene or liquid 1,2-polybutadiene will also not give a liquid non-drying oil which has such low viscosity and pour point and such high ignition and flash points as the polymer oil of this invention does.

The liquid material obtained by the hydrogenation according to this invention are novel polymer oils provided with the well-balanced advantageous properties, while the conventional non-drying oils have both advantageous and disadvantageous properties. The polymer oil of this invention may be widely used singly or jointly with at least one other non-drying oil and, if desired, further with ordinarily used additives, as a lubricant such as a lubricating oil or grease, hydraulic oil, cosmetic or ointment, insulating oil, thermal medium and solvent for pressure-sensitive paper.

The lubricant which is one of the polymer oil compositions of this invention, will be detailed hereinbelow.

In general, oil type lubricants are classified into lubricating oils remaining liquid at ambient temperatures and greases remaining solid or semi-solid at ambient temperatures, the greases being prepared by the incorporation of the lubricating oil with a suitable thickening agent. The oils used in the preparation of these conventional lubricants include mineral oils, diesters, silicone oils and the like.

Heat generated, and wear caused, at portions to which lubrication is applied will generally vary depending on the mechanical structure of said lubricated portions as well as a combination of load applied and velocity used. In order to minimize the wear of the lubricated portions of a metal it is required to form an oil film having increased strength on the surface of the portions. In general, the higher the viscosity of an oil is, the greater the strength of an oil film formed of said oil is, and the lubricity of a lubricant, whether a lubricating oil or grease, depends predominantly upon the properties of an oil used in the lubricant. Thus, more highly viscous mineral oils are recommended for use as a base material for a lubricant which is capable of forming stronger oil films and superior in load carrying capacity. The base oil for high-grade general-purpose grease is, for example, a mineral oil usually having a viscosity of approximately 120 centistokes at 37.78°C and about 13 centistokes at 98.89°C. The greases which contain as the base oil a mineral oil having a lower viscosity than the above are said to be not necessarily satisfactory in strength of oil film formed thereof and be inferior in load carrying capacity.

However, the lubricants containing as the base oil a highly viscous mineral oil are excellent in load carrying capacity but are comparitively high in pour point because of their high viscosity, thereby disadvantageously lacking fluidity at low temperatures. For instance, since the mineral oil used in the high-grade general-purpose greases usually has a pour point of approximately −15°C, the greases will not be useful as such at temperatures lower than approximately −5° to −10°C. Such greases are not useful at lower temperatures in a frigid climate and there have thus been developed lubricants containing a low viscous mineral oil as the base oil. However, practically usable mineral oils can have a pour point of only approximately −30°C at lowest even when incorporated with a pour point-lowering agent and they are thus very unsatisfactory in this respect. Many efforts have to date been made in an attempt to develop lubricants having excellent low-temperature properties with the result that the diesters and silicone oils are now commercially available.

Since the diesters and silicone oils have a pour point of −50°C or lower, lubricants containing at least one of these oils as the base oil can be used even under the circumstances at low temperatures such as −40°C, which temperatures are much lower than the lowest temperature at which the mineral oil-based lubricants can be used. However, since the diesters are extremely low viscous, it will be difficult for them to keep their viscosity proper at portions to be lubricated correspondingly to a temperature raise due to load applied to the portions when they are applied thereto. Thus, they are liable to allow their oil films to be torn off especially at the heavier load-applied ones of said portions thereby causing unusual wear and seizure. Although some of silicone oils are relatively highly viscous, the silicone oils are generally very inferior in load carrying capacity as compared with mineral oils having the same viscosity as the silicone oils and they are further insoluble in mineral oils or diesters, and vice versa. Therefore, by blending the silicone oil with the mineral oil or diester, they are not conducive to each other in overcoming their inherent drawbacks.

On the other hand, the lubricants containing the polymer oil of this invention are the superior ones from which such defects as the above are eliminated. As compared with the usual mineral oils, the lubricants of this invention are highly viscous at moderately high temperatures of 50°–100°C while they have inherently a remarkably low pour point and they can therefore be used at a temperature much lower than the lowest temperature at which the mineral oil-based lubricants can be used. Further, they are far excellent in load carrying capacity as compared with the diester- or silicone oil-based lubricants which have heretofore been for use at low temperatures. The lubricants of this invention include lubricating oils and greases, each of which contains the polymer oil of this invention.

The lubricating oils of this invention comprises the polymer oil as the base material and, if desired, ordinarily used additives such as a viscosity index improver, extreme-pressure additive, antioxidant, pour point-lowering agent, anti-rust agent, oiliness improver, water-proof stuff, coloring agent and the like. The greases of this invention are prepared by incorporating the polymer oil with a thickening agent or agents and, if desired, with at least one of said additives. The thickening agents which may be used include metallic soap type thickening agents such as calcium, sodium, aluminum, lithium, barium, lead, mixed and complex soaps, and non-soap type thickening agents such as silica and bentonite.

Since the polymer oil of this invention and the diester or mineral oil are excellently soluble in each other, a highly viscous oil can be obtained by blending the polymer oil with other oil as mentioned above. If such a highly viscous oil is used as the base oil for a lubricant, the lubricant will have low-temperature property and load carrying capacity which are well-balanced with each other. In this case the base oil should desirably contain the polymer oil of this invention in amounts of at least 20 percent, preferably 40 percent, by weight thereof.

The specific liquid polymers which may be used in the hydrogenation process of this invention are prepared as illustrated below.

Preparation 1

A 6-liter stainless steel-made reactor purged with nitrogen was charged with 800 g of benzene, 5 g of boron trifluoride . diethyl etherate and 0.6 g of water. The resulting mixture was thoroughly agitated, incorporated with a mixed solution of 2,100 g of 1,3-pentadiene and 1,400 g of n-pentane, and then polymerized at 40°C. After the end of the polymerization the polymer thus produced in the solution form was treated with activated clay to remove the used catalyst, washed with methanol and then vacuum dried at 70°C, thereby obtaining a light-yellow, transparent, liquid polymer in a yield of 63 percent by weight. The infra-red analysis of the thus-obtained liquid polymer indicated that its microstructure was: trans 80.4%, cis 14.8 percent and vinyl 4.8 percent. This polymer also had an iodine number of 270 as determined from JIS (Japanese Industrial Standard) K-5,400 based on Wijs method, and a number average molecular weight of 480 as measured by Vapor Pressure Osmometry (VPO).

Preparation 2

To a 6-liter stainless steel-made reactor purged with nitrogen were added 2,100 g of 1,3-pentadiene and 1,400 g of n-pentene to form a mixture which was thoroughly agitated and kept at 30°C. The mixture kept so warm was then incorporated with 2.8 g of catalyst prepared by reacting 148 g of boron trifluoride . diethyl etherate with 18 g of water at room temperature in an atmosphere of nitrogen, to start the polymerization thereof. Every lapse of 2.5, 5 and 7.5 hours after the start of polymerization, 1.1 g of the same catalyst as above was added to the polymerization reaction system. After the polymerization of ten hours, the polymer solution thus obtained was treated with activated clay to remove the used catalyst, washed with methanol and then vacuum dried at 70°C thereby obtaining a light-yellow, transparent, liquid polymer in a yield of 67 percent by weight. The infra-red analysis of the polymer so obtained indicated that its microstructure was: trans 79.5 percent, cis 15.0 percent and vinyl 5.5 percent. The polymer had an iodine number of 270 as determined from JIS K-5400 based on Wijs method, and a number average molecular weight of 860 as measured by Vapor Pressure Osmometry (VPO).

This invention will be better understood by the following examples.

Examples 1 – 4

These Examples illustrate processes for preparing a polymer oil of this invention and show the properties of the polymer oils obtained in comparison with conventional polymer oils.

In Example 1, a 500-ml pressure-proof autoclave was charged with 210 g of the liquid polymer of Preparation 1 and with 5 g of stabilized nickel (supplied under the trademark of N-113 by Nikki Kagaku Co., Ltd.). The autoclave containing the resulting mixture was filled with hydrogen to the extent that an initial hydrogen pressure of 30 Kg/cm² was reached, while keeping the autoclave at temperatures of 150° – 200°C. The hydrogenation was continued for an hour while suitably replenishing the autoclave with hydrogen since the hydrogen pressure would decrease without replenishment with hydrogen as the hydrogenation proceeded. The amount of hydrogen consumed was measured in terms of the total of hydrogen pressure drops (in Kg/cm²). After effecting the hydrogenation for an hour, the reaction mixture was cooled to room temperature, incorporated with 250 ml of n-hexane, thoroughly agitated and allowed to stand for one day. The supernatant fluid of the mixture was filtered through filter paper to separate therefrom a filtrate which was freed of the n-hexane thereby obtaining a hydrogenated liquid polypentadiene. The polymer oil so obtained was tested for its iodine number, Gardner color, odor and the like. In each of Examples 2 – 4 and Reference Examples 1 – 4, a similar procedure as used in Example 1 was followed using the specific liquid polymer and hydrogen as indicated in Table 1. The results are shown in Table 1.

(KOH mg/g polymer) which was the same as that of the original polymer oil of Example 1 and also had a kinematic viscosity of 129 cSt and a viscosity ratio (kinematic viscosity after the test/kinematic viscosity before the test) of 1.05. In addition, there was no attachment found in a lacquering test. From these results it is seen that the non-drying oil of this invention is very excellent in thermostability.

The polymer oil of Reference Example 2 was tested in the same manner as above with the result that it tended to color brown and harden at the surface portion.

Experiment 2

The polymer oils of Examples 1 – 4 and References 1 – 4, and the hydrogenated polybutenes (produced by Idemitsu Petrochemical Co., Ltd.) of Reference Examples 5 – 6 were tested for kinematic viscosities at 37.8°C and 98.9°C, pour points according to JIS (Japanese Industrial Standard) K 2269, and flash and ignition points according to JIS K 2274. The results of these comparative tests are shown in Table 2.

Table 1

|  | Reference Example 1 | Reference Example 2 | Example 1 | Example 2 | Reference Example 3 | Reference Example 4 | Example 3 | Example 4 |
|---|---|---|---|---|---|---|---|---|
| Liquid polymer to be treated (Number average molecular weight) | Prep. 1 480 | Prep. 1 480 | Prep. 1 480 | Prep. 1 480 | Prep. 2 860 | Prep. 2 860 | Prep. 2 860 | Prep. 2 860 |
| Amount of hydrogen consumed (Kg/cm²) | 0 | 278 | 344 | 440 | 0 | 273 | 344 | 440 |
| Polymer oil obtained | | | | | | | | |
| Iodine number | 270 | 100 | 60 | 5 | 270 | 100 | 60 | 5 |
| Color (Gardner) | 3–4 | 1 | 1 > | 1 > | 3–4 | 1 | 1 > | 1 > |
| Odor | Pungent | Slight | None | None | Pungent | Slight | None | None |

Prep. 1: Polymer of Preparation 1
Prep. 2: Polymer of Preparation 2

Table 2

| Polymer oil used | Ref. Example 1 | Ref. Example 2 | Example 1 | Example 2 | Ref. Example 3 | Ref. Example 4 | Example 3 | Example 4 | Ref. Example 5 | Ref. Example 6 |
|---|---|---|---|---|---|---|---|---|---|---|
| Composition of polymer oil* | PD | PD | PD | PD | PD | PD | PD | PD | PB | PB |
| Number average mol. wt. | 480 | 480 | 480 | 480 | 860 | 860 | 860 | 860 | 470 | 900 |
| Iodine number | 270 | 100 | 60 | 5 | 270 | 100 | 60 | 5 | 5 | 5 |
| Kinematic viscosity | | | | | | | | | | |
|   37.8°C/cSt | 132 | — | 123 | 120 | 4150 | — | — | 3750 | 240 | 11600 |
|   98.9°C/cST | 15 | — | 13 | 12 | 180 | — | — | 161 | 17 | 2400 |
| Pour point (°C) | –35 | –45 | –50 | –55 | –20 | –30 | –35 | –40 | –25 | –7.5 |
| Flash point (°C) | 155 | 170 | 195 | 204 | 216 | 220 | 237 | 255 | 150 | 200 |
| Ignition point (°C) | 175 | 193 | 221 | 230 | 232 | 234 | 255 | 280 | 170 | 230 |

*PD : Polypentadiene (hydrogenated)
PB : Polybutene (hydrogenated)

It is seen from these results that the polymer oil having an iodine number of 100 is inferior in color and odor while only those having an iodine number of not more than 60 are colorless and odorless. The Table also shows that each of the polymer oils of this invention has a Gardner color of not more than 1 and a Hazen number of not more than 50.

Experiment 1

The polymer oil having a number average molecular weight of somewhat more than 480 (because of hydrogenation) and an iodine number of 60, obtained in Example 1, was tested for oxidation stability by allowing it to stand in air at 165.5°C for 24 hours according to JIS K2514. After the test it had an acid value of 0.02

From Table 2 it is seen that the synthetic non-drying oils or polymer oils of this invention have a lower pour point than the conventional ones. Polymer oils having a low pour point are generally considered to have low flash and ignition points accordingly. To the contrary, the comparison with the hydrogenated polybutenes of Reference Examples 5 and 6 clearly indicates that the polymer oils of this invention have high flash and ignition points.

Experiment 3

The polymer oils of Examples 1 – 4 were mixed with various other oils as shown in Table 3 in the ratio by weight of 1 : 1 to see their mutual solubilities, respectively. The results are indicated in Table 3.

Table 3

| Polymer oil<br>Other oil | Example 1 | Example 2 | Example 3 | Example 4 |
|---|---|---|---|---|
| Squalane | O | O | O | O |
| Mink oil | O | O | O | O |
| Turtle oil | O | O | O | O |
| Olive oil | O | O | O | O |
| Camellia oil | O | O | O | O |
| Lanolin | Δ | Δ | Δ | Δ |
| Liquid paraffin | O | O | O | O |

In Table 3, the symbol O indicates that both of the oils were uniformly dissolved in each other thereby forming a transparent solution thereof, and the symbol Δ indicates the production of a somewhat turbid mixture of the oils used. From these results the polymer oils of this invention and these other oils are found to be very satisfactorily soluble in each other. In addition, the polymer oils of this invention when applied to human skin, indicated that they have excellent affinity (being nonsticky and well spread), keratolysis, and ductility with respect to the skin.

Example 5

The polymer oils of this invention are also satisfactory as insulating oils as is seen from the following Table 4. The polymer oils of Examples 2 and 4 and the hydrogenated polybutenes of Reference Examples 5 – 6 were tested for electrical properties at 80°C according to the method prescribed by JIS C-2320 (insulating oil). The results are shown in Table 4.

In view of the fact that the use of a shorter distance between electrodes means a severer test condition, the results of Table 4 clearly indicate that the polymer oils of this invention have a more excellent dielectric breakdown strength than the hydrogenated polybutenes which have heretofore been recommended as insulating oil.

Example 6

To investigate possible effects of the polymer oil of Example 2 on plastics contacted therewith when used as the lubricating oil, the polymer oil was subjected to a plastics-swelling test prescribed in ASTM D 722-45. Five test pieces (2 cm × 2 cm × 2 mm) of each of various plastics were immersed in the solvents, respectively, as is seen from Table 5. After their immersion at 23.5°C for 168 hours, the pieces were withdrawn from the solvents and measured for differences in weight and volume between before and after the test, respectively. The value obtained for each plastic material is the average of those obtained for the five test pieces of the same plastic material.

Table 5 indicates that the polymer oil of this invention exhibited superior properties in the oil-swelling test.

Table 4

| Polymer oil used | Examples | | Reference Examples | |
|---|---|---|---|---|
| | 2 | 4 | 5 | 6 |
| Composition of polymer oil | PD | PD | PB | PB |
| Number average mol. wt. | 480 | 860 | 470 | 900 |
| Volume resistivity (Ω·cm) | $1.2 \times 10^{15}$ | $12 \times 10^{15}$ | $0.8 \times 10^{15}$ | $2 \times 10^{15}$ |
| Dielectric constant | 2.1 | 2.2 | 2.1 | 2.2 |
| Dielectric loss tangent | $3 \times 10^{-4}$ =1 | $1 \times 10^{-4}$ =1 | $2 \times 10^{-4}$ =2 | $1 \times 10^{-4}$ =2 |
| Dielectric breakdown strength (KV) | 50 < =3 | 50 =4 | 50 < =5 | 50 =6 |

=1 Measured at 50 c/s
=2 Measured at 60 c/s
=3 Distance between electrodes 2mm
=4 do. 1 mm
=5 do. 2.54 mm
=6 do. 2.5 mm
PD : Polypentadiene (hydrogenated)
PB : Polybutene (hydrogenated)

Table 5

| Plastics<br>Solvent / Difference | *4 Polyethylene | | *5 Polypropylene | | *6 Polyvinyl chloride | | *7 Polystyrene | | *8 Polymethyl-metacrylate | |
|---|---|---|---|---|---|---|---|---|---|---|
| | Wt. (%) | Vol. (%) | Wt. (%) | Vol. (%) | Wt. (%) | Vol. (%) | Wt. (%) | Vol. (%) | Wt. (%) | Vol. (%) |
| Polyethylene glycol *1 | −1.68 | −0.22 | −1.38 | −0.33 | −1.27 | −0.40 | −1.68 | −0.36 | −1.10 | −5.88 |
| Polypropylene glycol *2 | −1.55 | +0.07 | −1.31 | −0.36 | −1.52 | −0.56 | −1.65 | −0.38 | 1.09 | −1.09 |
| Dioctyl Sebacate | −1.39 | −0.13 | −1.29 | −0.21 | −1.58 | −0.15 | −1.65* | +3.42* | −0.95 | +0.04 |
| Silicone oil *3 | −1.48 | −0.02 | −1.28 | −0.32 | −1.31 | −0.58 | −1.44 | −0.16 | −0.67 | +1.29 |
| Polymer oil of Ex. 2 | +0.31 | +0.08 | +0.23 | −0.11 | +0.06 | +0.01 | +0.09 | −0.19 | +0.02 | +0.09 |

− : Decrease after the test
+ : Increase after the test
* Surface thoroughly swollen with oil
*1 Number average molecular weight 1000
*2 Number average molecular weight 1000
*3 Shin-etsu silicone KF-96, Shin-etsu Chemical Co., Ltd.
*4 Staflene E-650, Nisseki Chemical Co., Ltd., st. gr. 0.96, M.I. (g/10 min) 5/10
*5 Noblen K-101, Sumitomo Chemical Co., Ltd., M.I. 2/10
*6 Nipeon 103 ET, Nippon Zeon Co., Ltd. Degree of polymerization 800
*7 Styron GT-666, Asahi Dow Co., Ltd. N.I. 8/10
*8 Deluglass A, Asahi Kasei Co., Ltd. Number average mol. wt. 100,000

Example 7

1,3-pentadiene was polymerized in benzene in the presence of boron trifluoride.diethyl etherate to obtain a liquid polypentadiene having an iodine number of 270 as determined according to Wijs method, a number average molecular weight of 650 as measured by VPO and, as the microstructure, 80.4 percent trans, 14.8 percent cis and 4.8 percent vinyl structures. Two hundred and ten grams of the specific liquid polymer so obtained and 5 g of stabilized nickel (supplied under the trademark of "N-113" by Nikki Kagaku Co., Ltd.) were charged into a 500-ml pressure-proof autoclave which was then filled with hydrogen to the extent an initial hydrogen pressure of 30 Kg/cm$^2$ was reached while keeping the autoclave at temperatures of 150°– 200°C. The hydrogenation was continued for an hour while suitably replenishing the autoclave with hydrogen since the hydrogen pressure otherwise decreased with the progress of the hydrogenation. Another 210 g of the specific liquid polymer was hydrogenated under the same conditions as above except the amount of hydrogen consumed. There were thus obtained two polymer oils A and B of this invention having iodine numbers of 5 and 35, respectively, which polymer oils were each colorless, transparent (Hazen number 30) and odorless.

Example 8

The mineral oil, dioctyl sebacate (DOS) and silicone oil which are generally used as the base oil for lubricants, and the polymer oil A obtained in Example 7, were tested for pour point, viscosity (37.8°C) and mutual solubility. The results are shown in Table 6.

Table 6

| Oil used | Pour point (°C) | Viscosity (cSt) | Mutual solubility |
| --- | --- | --- | --- |
| Mineral oil[1] | −15 | 76.6 | DOS, Polymer oil A |
| DOS | −57 | 12.4 | Mineral oil Polymer oil A |
| Silicone oil[2] | −65 | 1000[3] | None |
| Polymer oil A | −55 | 950 | Mineral oil, DOS |

[1] SAE No. 20 No additives
[2] KH-1000 (Shinetsu Kagaku Co., Ltd.)
[3] Viscosity at 25°C From the results shown in Table 6, it is apparent that the polymer oil A exhibits a pour point nearly the same as that of the DOS or silicone oil which has been recommended as a base oil for lubricants having excellent low-temperature properties, and that the polymer oil A is also excellently soluble in the mineral oil and DOS, and vice versa. It is further apparent from Table 6 that although oils (SAE No. 20) have been recommended as those having relatively satisfactory low-temperature properties since they can be adjusted to have a pour point of as low as about −30°C by being incorporated with a pour point-lowering agent, they have much lower viscosity as compared with the polymer oil of this invention.

Examples 9 – 14

Twelve parts by weight of each of the base oils as indicated in Table 7 was charged, together with 12 parts by weight of lithium hydroxystearate, into a pressure-proof reactor. The resulting mixture was thoroughly mixed at 200°C for 40 minutes, incorporated further with 76 parts by weight of the same base oil and thoroughly mixed while heated, thereafter cooled and then subjected to rolling thereby to obtain a grease. The greases so obtained were then tested according to the test methods prescribed in the JIS (Japanese Industrial Standard). The results obtained are shown in Table 7. For comparison, the mineral oil-, DOS- and silicone oil-based greases which have been marketed as those having good low-temperature properties, were tested in the same manner as above.

The marketed greases used for comparison were those which had been improved in lubricating properties, especially oxidation stability and oil film strength, by being allowed to contain additives such as antioxidants and extreme pressure agents. On the other hand, the greases of this invention indicated in Table 7 have an oil film strength which is equal or superior to that of the DOS- and silicone oil-based greases commercially available at present although they contain the base oil incorporated with no such additives as above. Since it is known that the incorporation of a grease with an extreme pressure agent will increase the oil film strength of the grease by approximately 1.5 – 2 Kg/cm$^2$, it is apparent that said polymer oils of this invention will become those having far excellent load carrying capacity as compared with the commercially available greases by incorporating the extreme pressure agent thereinto.

Table 7

| | | Example | | | | | | Reference Example | | |
| --- | --- | --- | --- | --- | --- | --- | --- | --- | --- | --- |
| | | 9 | 10 | 11 | 12 | 13 | 14 | 7 | 8 | 9 |
| Base oil | Liquid polymer A (Parts by weight) | 100 | 80 | 50 | 20 | 50 | — | *5 Mineral oil-based grease | *6 DOS-based grease | *7 Silicone oil-based grease |
| | Liquid polymer B ( do. ) | — | — | — | — | — | 100 | | | |
| | Mineral oil[4] ( do. ) | — | 20 | 50 | 80 | — | — | | | |
| | DOS ( do. ) | — | — | — | — | 50 | — | | | |
| Appearance | | White; buttery | Light yellow; buttery | Yellow; buttery | Yellow; buttery | Yellow; buttery | Yellow; buttery | Yellow; buttery | Yellow; buttery | Milk-white; buttery |
| Penetration (250°C) | | 253 | 280 | 272 | 268 | 243 | 257 | 274 | 278 | 275 |
| Dropping point (°C) | | 202 | 194 | 197 | 196 | 180 | 200 | 195 | 190 | 200 |
| Oxidation stability[8] (mg KOH/g) | | 176 | 124 | 141 | 144 | 122 | 6.9 | 0.34 | 0.15 | 0.10 |
| Worked stability[9] | | 238 | 268 | 264 | 260 | 254 | 242 | 315 | 294 | 273 |
| Oil film strength[10] (Kg/cm$^2$) | | 5.0 | 6.0 | 6.0 | 6.0 | 4.5 | 5.0 | 5.0 | 4.5 | 3.5 |

[4] SAE No. 30 No additives (160 cSt at 37.8°C)
[5] Supplied under the trademark of NPC-GB by Nippon Koyu Co., Ltd.
[6] Supplied under the trademark of NPC-A by Nippon Koyu Co., Ltd.
[7] Supplied under the trademark of G-40 by Shin-etsu Chemical Co., Ltd.
[8] 98.9°C × 100 hours
[9] 100,000 W
[10] Four ball test, 200 rpm at room temperature, 0.5 Kg/cm$^2$ applied, 30 seconds In addition, according to Table 7 the polymer oils of this invention exhibit a somewhat higher oxidation stability value than the mineral oil containing no antioxidant, but they can be improved in oxidation stability to the same level as the marketed greases. However, since the grease containing the liquid polymer B as the base oil is somewhat inferior in oxidation stability to that containing the liquid polymer A as the base oil, it is desirable that the polymer oils to be obtained will have a low iodine number.

Examples 15 – 19

A pressure-proof vessel was charged with 76.5 parts by weight of each of the base oils as indicated in Table 8 together with 2 parts by weight of methanol. The whole mass was mixed at 80°C for an hour, incorporated further with 10 parts by weight of the same base oil and thoroughly mixed while being heated, thereafter cooled and then subjected to rolling to obtain a grease. The greases thus obtained were tested in the same manner as in Example 9. The results are indicated in Table 8.

pentadiene units is of trans structure, and then hydrogenating the thus-produced liquid polymer to the extent that its iodine number is decreased to not more than 60 as determined by Wijs method, thereby obtaining said polymer oil.

2. A process according to claim 1, wherein at least one other olefin copolymerizable with 1,3-pentadiene is substituted for the 1,3-pentadiene in amounts of not more than 20 percent by weight of the total monomers.

3. A polymer oil consisting of a hydrogenated polypentadiene, having a number average molecular weight of from 300 to 1,000, an iodine number of not more than 60, an acid value of not more than 0.02 mg KOH/g, a saponification value of not more than 0.02 mg KOH/g, a Hazen number of not more than 50, a specific gravity of from 0.92 to 0.94, and a pour point of not higher than −30°C and a flash point of not lower than 180°C.

4. A polymer oil consisting of a liquid polymer, in the hydrogenated form, prepared from not less than 80 percent by weight of 1,3-pentadiene and not more than 20 percent by weight of at least one other olefin co- Table 8

| | | | Example | | | | | Reference Example |
|---|---|---|---|---|---|---|---|---|
| | | | 15 | 16 | 17 | 18 | 19 | 10 |
| Base oil | Liquid polymer A | (Parts by weight) | 100 | 80 | 50 | 20 | 50 | — |
| | Mineral oil [1] | ( do. ) | — | 20 | 50 | 80 | — | 100 |
| | DOS | ( do. ) | — | — | — | — | 50 | — |
| Appearance | | | Light-yellowish green; buttery | Light-yellowish green; buttery | Yellowish green; buttery | Yellowish green; buttery | Yellowish green; buttery | Yellowish green; buttery |
| Penetration (25°C) | | | 325 | 325 | 326 | 324 | 290 | 332 |
| Dropping point (°C) | | | — | — | — | — | — | — |
| Oxidation stability (mg KOH/g) | | | 18 | 15 | 13 | 11 | 12 | 11 |
| Worked stability | | | 304 | 332 | 310 | 336 | 292 | 331 |
| Oil film strength | | | 5.5 | 6 | 6 | 6 | 5.5 | 5.5 |

[1] SAE No. 30 No additives added.

From the results of Table 8 it is seen that the greases of this invention have an oil film strength which is equal or superior to that of the conventional greases containing the relatively highly viscous mineral oil as the base oil.

What is claimed is:

1. A process for preparing a polymer oil of pour point of not higher than −30°C, a flash point of not lower than 180°C, a specific gravity of 0.92 – 0.94, an acid value of not more than 0.02mgKOH/g, a saponification value of not more than 0.02mgKOH/g, a Hazen number of not more than 50, a number average molecular weight of 300 – 1,000, and an iodine number of not more than 60 comprising the steps of:

polymerizing a monomer containing at least 80 percent of 1,3-pentadiene at temperatures of from −30°C to 100°C in the presence of a homogenizable Friedel-Crafts type catalyst to produce a liquid polymer having a number average molecular weight of 300 – 1,000 and an iodine number of not less than 250 wherein at least 70 percent of the polymerizable therewith, the polymer oil having a number average molecular weight of from 300 to 1,000, an iodine number of not more than 60, an acid value of not more than 0.02 mg KOH/g, a saponification value of not more than 0.02 mg KOH/g, a Hazen number of not more than 50, a specific gravity of from 0.92 to 0.94, and a pour point of not higher than −30°C and a flash point of not lower than 180°C.

5. An insulating oil comprising the polymer oil of claim 3 as the base oil.

6. An insulating oil comprising the polymer oil of claim 4 as the base oil.

7. A lubricant comprising the polymer oil of claim 3 as the base oil.

8. A lubricant comprising the polymer oil of claim 4 as the base oil.

9. A lubricant comprising the polymer oil of claim 3 as the base oil, and a thickening agent.

10. A lubricant comprising the polymer oil of claim 4 as the base oil, and a thickening agent.

* * * * *